US008655692B2

(12) United States Patent
Junkin

(10) Patent No.: US 8,655,692 B2
(45) Date of Patent: Feb. 18, 2014

(54) METHOD AND SYSTEM FOR NETWORK-ENABLED VENUE BOOKING

(75) Inventor: William W. Junkin, Corona del Mar, CA (US)

(73) Assignee: Junkin Holdings, LLC, Corona Del Mar, CA (US)

( * ) Notice: Subject to any disclaimer, the term of this patent is extended or adjusted under 35 U.S.C. 154(b) by 641 days.

(21) Appl. No.: 12/493,693

(22) Filed: Jun. 29, 2009

(65) Prior Publication Data

US 2009/0326992 A1   Dec. 31, 2009

Related U.S. Application Data

(60) Provisional application No. 61/129,464, filed on Jun. 27, 2008.

(51) Int. Cl.
*G06Q 10/00* (2012.01)
*G06Q 50/00* (2012.01)

(52) U.S. Cl.
USPC .................................. 705/5; 705/37

(58) Field of Classification Search
USPC .................................... 705/5, 6, 37
See application file for complete search history.

(56) References Cited

U.S. PATENT DOCUMENTS

| | | | | |
|---|---|---|---|---|
| 7,584,123 B1 * | 9/2009 | Karonis et al. | ............... | 705/26.3 |
| 2001/0054064 A1 | 12/2001 | Kannan | | |
| 2003/0069829 A1 * | 4/2003 | Gathman et al. | ............... | 705/37 |
| 2003/0187802 A1 | 10/2003 | Booth | | |
| 2005/0197894 A1 * | 9/2005 | Fairbanks et al. | ............... | 705/14 |
| 2006/0011716 A1 | 1/2006 | Perkowski | | |
| 2006/0095344 A1 * | 5/2006 | Nakfoor | ........................ | 705/26 |
| 2007/0055554 A1 * | 3/2007 | Sussman et al. | ................. | 705/5 |
| 2007/0179792 A1 * | 8/2007 | Kramer | ............................ | 705/1 |
| 2007/0250354 A1 * | 10/2007 | Neulight | ........................ | 705/5 |
| 2008/0004916 A1 * | 1/2008 | Panay | .............................. | 705/5 |
| 2008/0010105 A1 | 1/2008 | Rose et al. | | |
| 2008/0097825 A1 * | 4/2008 | Leach et al. | .................... | 705/10 |
| 2008/0133286 A1 * | 6/2008 | Islam | ................................ | 705/5 |
| 2009/0248471 A1 * | 10/2009 | Panay et al. | ........................ | 705/8 |

OTHER PUBLICATIONS

Connolly, et al., Rockonomics: The Economics of Popular Music, Apr. 2005, NBER Working Paper No. w11282. Available at SSRN: http://ssrn.com/abstract=711924.*
International Search Report and Written Opinion of the International Searching Authority issued in International Patent Application No. PCT/US09/049060, mailed Jun. 2, 2010.

* cited by examiner

*Primary Examiner* — Daniel Vetter
(74) *Attorney, Agent, or Firm* — McDermott Will & Emery LLP

(57) ABSTRACT

Method and system for network-enabled means to book a venue. Via a network, a bidding sub-system is deployed for providing information related to a venue to a subscriber and receiving a bid from the subscriber to book the venue for a future event. Information related to a received bid is posted via electronic means and provided to a venue representative who represents the venue and desires to receive a bid via the network for booking the venue. Through a venue representative control sub-system, the venue representative is able to select a bid to book the venue for a future event hosted by a subscriber who placed the selected bid via the bidding mechanism.

42 Claims, 13 Drawing Sheets

METHOD AND SYSTEM FOR NETWORK-ENABLED VENUE BOOKING

RELATED APPLICATION

The present invention claims priority of provisional patent application No. 61/129,464 filed Jun. 27, 2008, the contents of which are incorporated herein in their entirety,

BACKGROUND

1. Technical Field

The present teaching relates to method and system for Internet applications. More specifically, the present teaching relates to method and system for network-enabled venue booking and systems and applications incorporating the same.

2. Discussion of Technical Background

The advancement of the Internet technology has made it possible for millions of users to do business across the globe at a click of a mouse. Many traditional business transactions can now be securely carried out on the Internet with efficiency, precision, and reliability. In addition, due to the fact that an appropriate Internet platform can be implemented to consolidate certain types of information from different sources, identification of appropriate parties that certain transactions are targeting is made much easier. In addition, the Internet platform has also been used to increase sales in a e-commerce setting.

However, there are certain business sectors that are still operating in a manner similar to the way things were done prior to the Internet era. For example, most of the activities relating to booking a venue (e.g., a theater) to host a future event (e.g., a stage play) is still largely done through human agencies by making calls to arrange the reservation. Although currently some booking activities can be done on-line, they are usually for reserving seats at certain venues with a scheduled event, e.g., at Dodger's Stadium, a Broadway show, etc. Matching an appropriate venue for an event providing a certain type of content (e.g., a Broadway theater is for hosting a show rather than for hosting a cinema festival) is still largely done via human agencies and depends on the familiarity of the agencies with different venues. In the Internet era, those operative modes are not efficient. Therefore, there is a need for a network-enabled system and method to electronically book venues.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

The present teaching relates to network-enabled applications in general. More specifically, the present teaching relates to network-enabled venue booking and systems and methods incorporating the same. An Internet platform is utilized to assist in identification of appropriate parties that certain transactions are targeting and increasing sales to a venue by optimizing demand through the creation and management of a competitive bidding process, while providing those wishing to book venues with a platform to manage their tours or any events they would like to host at a future time. In addition, the disclosed platform also enables those wishing to book a venue to create demand and pre-sell the right sized venue prior to a commitment to a venue.

The present teaching discloses a full system that matches venues with appropriate content of a future event and provides mechanisms by which venues and bidders on booking such venues can simultaneously optimize demand and increase attendance and sales. The disclosed mechanisms also allow a measure of control to the consumer by enabling use of social networking to request and determine the content at venues.

Figure 1:
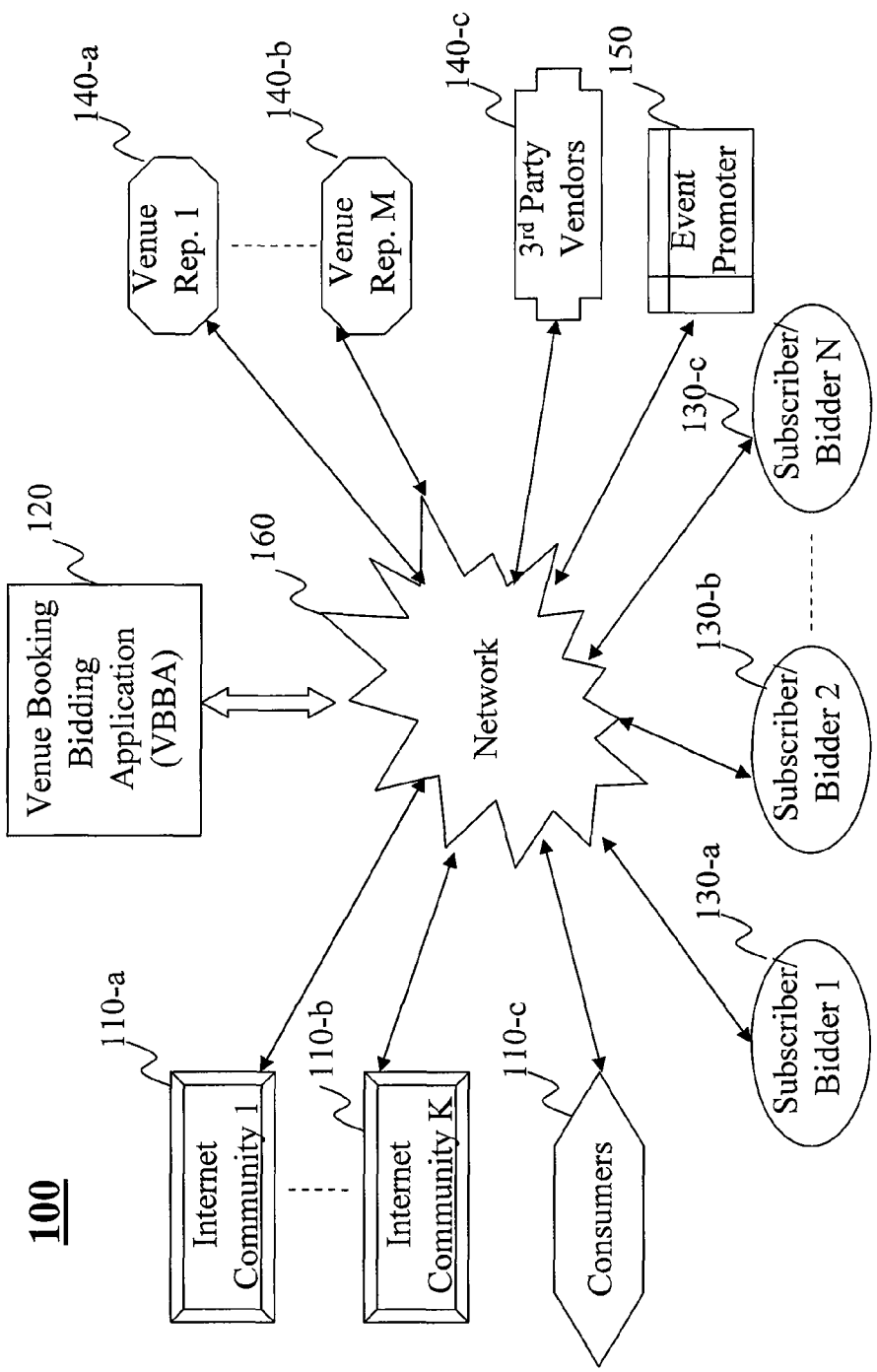
FIG. 1 depicts an exemplary cross-network system configuration for network-enabled venue booking, according to an embodiment of the present teaching.

FIG. 1 depicts an exemplary cross-network system configuration 100 for network-enabled venue booking, according to an embodiment of the present teaching. In this illustrative system 100, there are a plurality of venue representatives, including venue representative 1 140-*a*, . . . , venue representative M 140-*b*. Those venue representatives interact with a venue booking bidding application (VBBA) 120 via a network 160.

The VBBA 120 is a network-enabled application that facilitates network-based venue booking, which allows a venue representative to post information related to the represented venue(s), invite biddings, solicit pre-commitment confirmation for specific biddings, and select a winner. The interaction between VBBA 120 and a venue representative includes obtaining information related to the venue(s) that a venue representative is responsible for. Such information includes, e.g., location, capacity, and availability of the venue(s) as well as, optionally, certain preferences that the venue representative expresses. Some examples of preferences may be the type of event hosted at the venue(s), the demographics of the participants (e.g., a venue may be suitable for children's events), or the expected unit rate in price for using each venue.

The plurality of venue representatives 140 communicate with VBBA 120 via network 160, which may be of any type capable of supporting the needed communications. For instance, the network can be the Internet, a proprietary network, a virtual network, a Public Switched Telephony Network (PSTN), a wireless network, a wired network, a local area network (LAN), a wide area network (WAN), or any combination thereof.

System configuration 100 also includes a plurality of subscribers, including subscriber 1 130-*a*, . . . , subscriber 2 130-*b*, . . . , and subscriber N 130-*c*, who communicate with VBBA 120 via the network to bid for venues. Such subscribers may sign up as a member of VBBA 120, as an individual active on the Internet, as a member of any one of a plurality of Internet communities, such as Internet community 1 110-*a*, . . . , Internet community K 110-*b*. Examples of such Internet communities include FaceBook, any interest group organized on, e.g., Blogs, ChatRooms, or any virtual groups gathered via the Internet. When a subscriber belongs to a particular Internet community, say Face Book, the subscriber may communicate with VBBA 120 via a connection through this Internet community. Alternatively, a subscriber may also directly act as a member of the VBBA.

The exemplary system 100 may also optionally include an event promoter 150, consumers 110-*c*, and one or more third party vendors 140-*c*. The event promoter's job is to promote and organize events. For instance, an event promoter may try to put together a music festival at a City Hall operated by the city government. The desired types of music include, e.g., Jazz, Classical, and New Age music. Such an event promoter may communicate with one or more venue representatives (e.g., the city government) via VBBA 120, to, e.g., put together a program that is appropriate for the venue and post information related to the desired program via VBBA 120, e.g., information related to the types of music, types of bands (e.g., traditional Jazz rather than modern Jazz), to attract bidders (or subscribers) to place bids via VBBA 120.

A consumer may be an individual who may interact with VBBA 120 for different functionalities, as described below. A third party vendor may be a party who is associated with a certain event hosted by a bidder at a venue represented by a venue representative and who may provide value-added services at such an event. Details related to the consumer and third party vendor are described with reference to FIGS. 12-13.

Each venue representative interacting with VBBA 120 may list a plurality of venues that he/she represents. For every available time slot of each venue, there may be an unlimited number of bids placed by different bidders. As described in detail below, a bidder can interact with VBBA 120 to view the listed venues and place a bid for booking a venue. In addition, a bidder can utilize VBBA 120 to invite, via electronic means (e.g., emails or text messages), other parties connected via social networking sites (Internet communities) to inform such recipients that the bidder has made an attempt to book a venue for a certain future event on a particular date(s) and time and request support or commitment from such parties.

In some embodiments, a bidder who receives a predetermined degree of pre-event commitment of attendance (e.g., more than 50%, specified by, e.g., the venue representative of the venue) of his/her event may become the winner of the bidding. For instance, a music venue may sell 100 tickets (25% attendance) on a normal Monday night. The representative of the venue may stipulate, via VBBA 120, that the first bidder to successfully pre-sell 200 tickets (50% attendance) will win the bid. Several bands may compete to be the first to pre-sell the predefined number of tickets in order to win the bid.

In some embodiments, prior to the bidding, a venue representative may provide an initial set of bidding terms. This may include, e.g., the unit price the venue will cost for each availability slot. Such unit price may be a fixed rate or a percentage of the ticket sale per slot. Other initial terms may include, e.g., the types of event to be hosted at the venue. For instance, Kennedy Center may expressly stipulate that it will not take any bid to host a punk music event. Given the constraints specified by the venue representative, VBBA 120 may automatically refuse, based on information related to a bidder (e.g., provided to VBBA 120 upon signing up), a bidder that fails to meet the initial requirements of the venue to participate in the bidding for that venue.

A bidder may place multiple bids for different venues for the same future event. VBBA 120 may enforce certain restrictions on the bidder's ability to occupy too many venues without allowing others to participate in a fair bidding process. For each future event to be held at a venue, VBBA 120 may automatically assign a unique event identification. With that identification, a bidder may be allowed to place bids for multiple venues under the same event identification. However, once the bidder wins on a bid for a particular venue, the VBBA 120 may remind the bidder to drop all other bids placed on other venues for the same event or alternatively, may automatically remove all other bids.

In some embodiments, VBBA 120 may allow a bidder to list all future events that he/she intends to hold within a specified period of time (e.g., 6 months) before the bidder places any bid. Based on such planned future events, VBBA 120 may broadcast such a list to a variety of audience or consumers via electronic means and receive electronic responses from such audience or consumers to indicate whether they would like to attend such events.

In some embodiments, depending on the geographical locations of such received responses, VBBA 120 may automatically classify the responses to assist to characterize the demand. Such classification may be dynamically performed according to certain criteria, e.g., time period and geographical locations. The classification may be requested by the bidder or automatically performed. Such classification result may be provided to the bidder to allow the bidder to perform market assessment. For example, based on such information, the bidder can reach a realistic understanding as to where the demand is with respect to each event and then place its bid for the event at a venue that can potentially provide the bidder the best chance to win the bid and at the same time to allow the bidder to achieve the optimized financial return.

Figure 2:
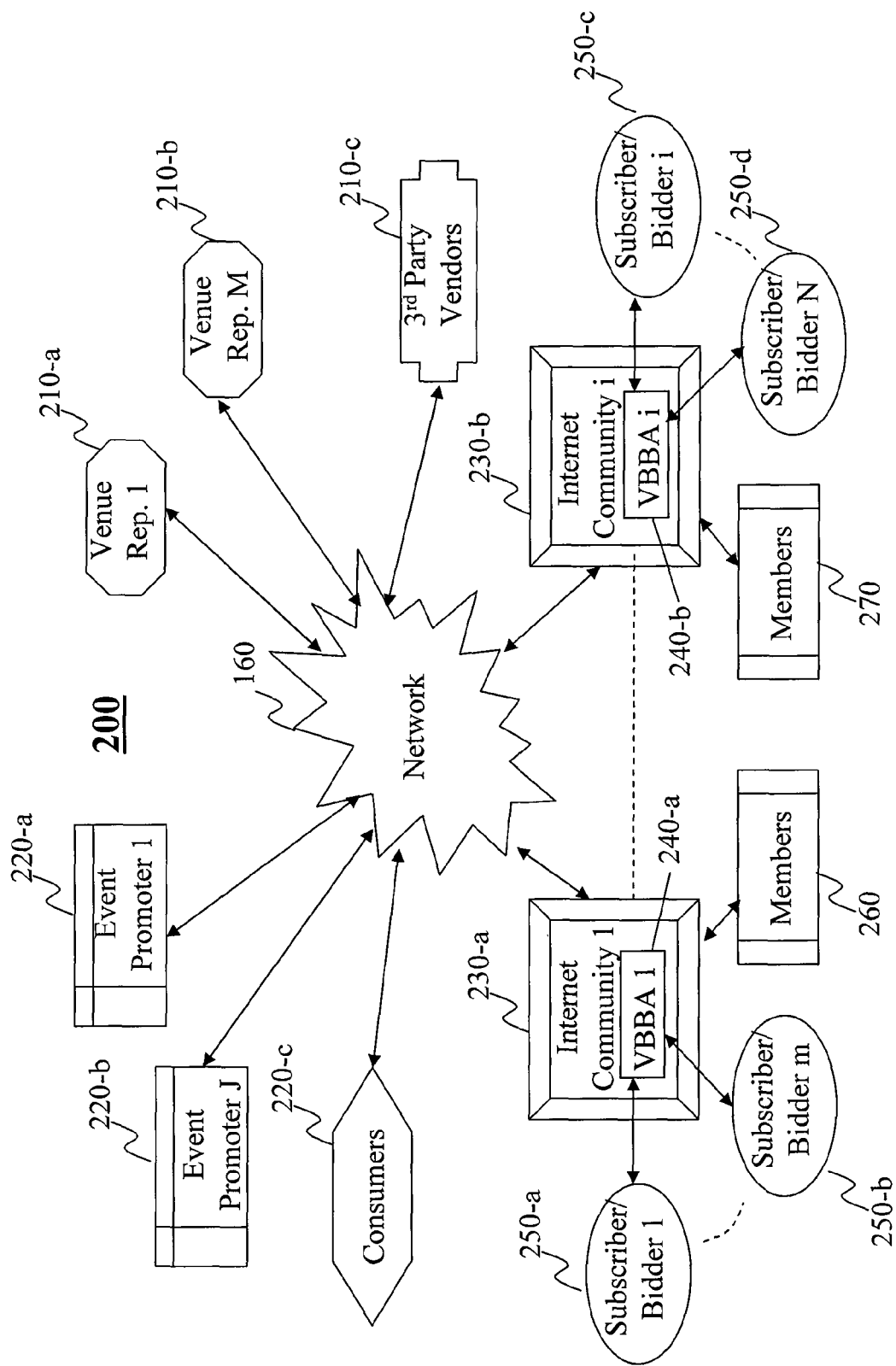
FIG. 2 depicts another exemplary cross-network system configuration for network-enabled venue booking, according to an embodiment of the present teaching.

FIG. 2 depicts another exemplary cross-network system configuration 200 for network-enabled venue booking, according to an embodiment of the present teaching. In this illustrated configuration, a VBBA is deployed individually within or shared by one or more Internet communities. As illustrated, different instances of VBBAs may be embedded within different Internet communities: VBBA 1 240-*a* is embedded within Internet community 1 230-*a*, . . . , VBBA i 240-*b* is embedded within Internet community i 230-*b*. Each Internet community may have one or more subscribers or members associated therewith. Internet community 1 230-*a* has a plurality of subscribers, 250-*a*, ..., 250-*b*, while Internet community i 230-*b* may also have a plurality of subscribers 250-*c*, ..., 250-*d*.

In some embodiments, subscribers of each Internet community may overlap with members of the Internet community. For instance, Internet community 1 230-*a* may have 125 members, of which 27 may also be subscribers of VBBA 1 240-*a*. For instance, some members of FaceBook may be musicians who regularly give concerts. Those members may sign up as subscribers of VBBA 1 240-*a* so that they can regularly check information associated with different venues, e.g., availability and cost, in order to plan their tours and bid for booking venues that suit their needs. Thus, subscribers of the VBBA in each Internet community may interact, as shown in FIG. 2, with the embedded VBBA for their venue booking needs.

Similar to the exemplary configuration 100, there are a plurality of venue representatives 210-*a*, ..., 210-*b* that communicate with one or more VBBAs associated with different Internet communities on their needs related to getting venues in their charge booked via biddings. In addition, there may be a plurality of event promoters 220-*a*, ..., 220-*b*, who communicate with different venue representatives via the network 160 or VBBAs, in a similar manner as described above, to develop relevant venue information (e.g., a particular music festival program at City Hall) for the purpose of receiving and selecting appropriate booking for the planned events. Furthermore, similar to what is included in FIG. 1, the exemplary configuration 200 may also include, optionally, consumers who can directly communicate with any one of the VBBAs described herein for a variety of purposes. Similarly, exemplary configuration 200 may also optionally include third party vendors who may provide value-added services at a venue where an event is held by a bidder. Details regarding how consumers and third party vendors interact with VBBAs are described with reference to FIGS. 12-13.

Figure 3:
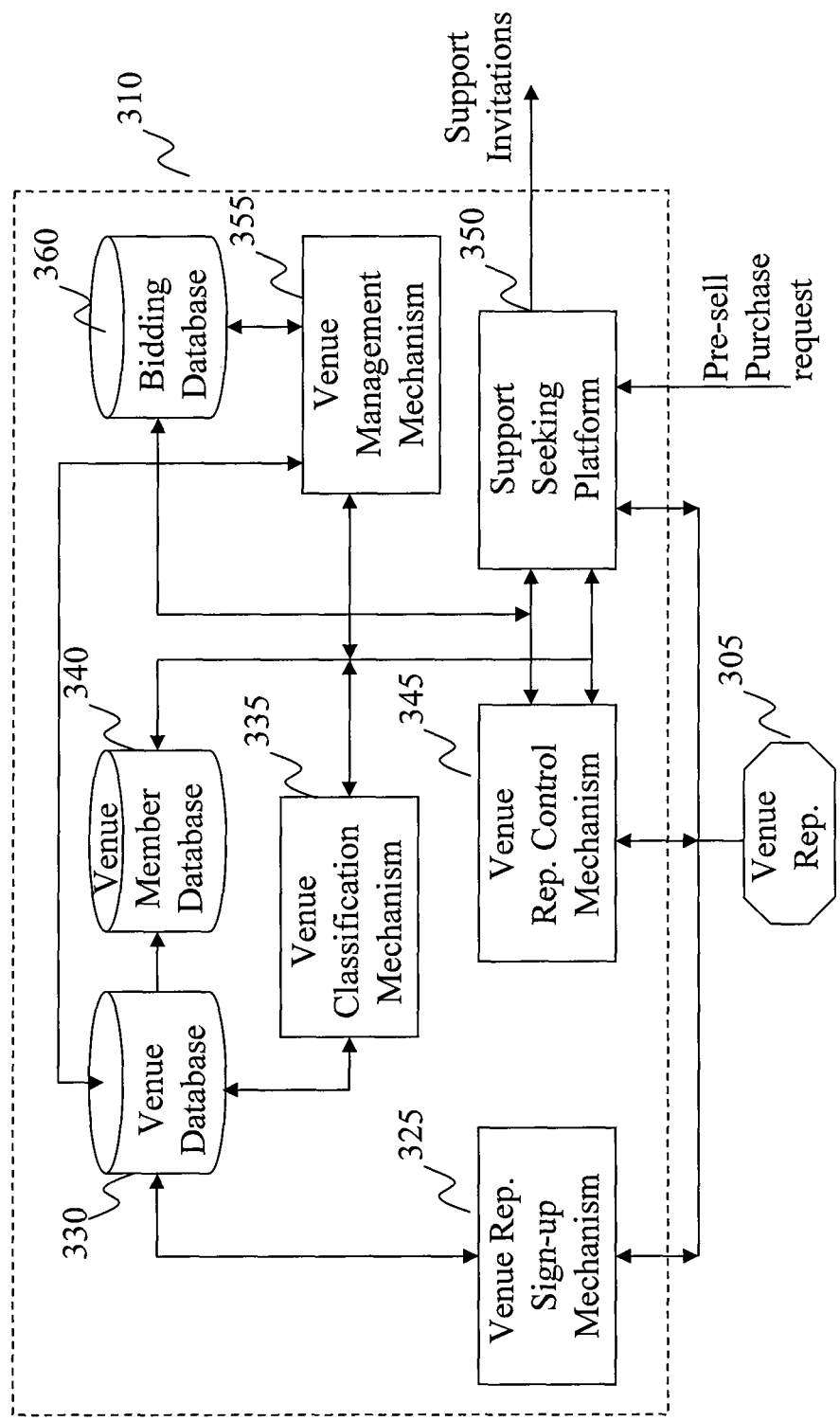
FIG. 3 depicts an exemplary diagram of a sub-system for network-enabled venue booking, according to an embodiment of the present teaching.

FIG. 3 depicts an exemplary diagram of a sub-system 310 for network-enabled venue booking, according to an embodiment of the present teaching. The sub-system 310 is designed for support interactions and processing related to a venue representative 305. The sub-system 310 comprises a venue sign-up mechanism 325, a venue database 330, a venue management mechanism 355, and a venue management representative control mechanism 345. The venue sign-up mechanism 325 provides an interactive means that allows a venue representative to provide or update information related to the venue(s) under the control of the venue representative and records such information in the venue database 330 for future retrieval.

Optionally, a venue representative may also provide information related to members of a venue such as members of the Kennedy Center in Washington D.C. In some embodiments, such member information may be stored in a separate venue member database 340, as shown in FIG. 3, and may be cross referenced with respect to the information related to the venue associated therewith. In some embodiments, such information may be stored in a same database (not shown) but information related to the venue and information related to its members may be accessed either together or separately, depending on the needs.

In some embodiments, the sub-system 310 may also provide an optional function to categorize different types of venues via a venue classification mechanism 335. For instance, all venues that can be used to host a music event may be categorized into one group due to the fact that such musical events require that a venue possess special acoustic properties. Criteria used to categorize venues may also be dynamically provided so that adaptive categorization may be achieved. For instance, the capacity of a venue may be used to classify all recorded venues so that if there is a need for a small stage play in a low capacity venue, it can be easily identified. Another example criterion may be existence of a platform where a cat walk for a fashion show is possible.

The venue classification mechanism 335 may store the classification result in the form of, e.g., a specific indexing structure, which can be used later to facilitate a retrieval request made with respect to the same classification criterion. For example, a venue capacity may be used as a criterion to categorize all venues in terms of three capacity levels, e.g., small, medium, and large. The classification result may correspond to an indexing scheme that describes a grouping of all venues according to such a criterion. If such indexing scheme is stored, a future request asking for, e.g., all venues with a medium capacity, can be entertained properly. The classification may be activated by different parties, e.g., an administrative staff of a VBBA via the venue management mechanism 355 or a subscriber (not shown), e.g., on a demand based request.

In the exemplary sub-system 310, there is an optional bidding database 360. In situations where bids have been made, the bidding database 360 stores all the bids made so far which can be retrieved upon requests, e.g., made by venue representatives via the venue representative control mechanism 345. For instance, a venue representative may request to view all the bids made on the venue(s) he/she represents. The venue representative control mechanism 345 may also be used to facilitate a venue representative to interactively respond to each bid, evaluate different bids, making a counter offer on the bid, or make a selection as to which bid to accept. During the interaction, whenever applicable, relevant information stored in different databases may be updated dynamically. For instance, if a venue representative accepts a particular bid, the availability of the represented venue has to be updated, e.g., the date and time frame for which the bid has been accepted are made no longer available.

The exemplary sub-system 310 may also include an optional support seeking platform 350. Through the support seeking platform 350, a venue representative may request, with respect to a particular bid, the VBBA to invite all members of the venue the bid is for to vote on whether a member or how many of such members will support the event the bid is placed for. For instance, if a Jazz band (subscriber) places a bid for booking a City Hall in a particular jurisdiction (venue) for a Jazz music show, the representative of the City Hall may request the VBBA to send emails to all members of the City Hall to test whether there is any interest or willingness to commit to the event from its members. Specific responses may be sought, e.g., asking for supporting members to, e.g., request each member to send a pre-sell purchase of the event back to the venue representative.

Such pre-sell purchases will allow the venue representative to assess which bid has the best chance to yield the highest profit. The system can be set in such a way that such pre-sell purchases will not be charged for until the event is definitely going to happen. When such an invitation is to be sent to all members of a venue, the support seeking platform 350 may automatically contact such members based on, e.g., the membership information stored in the venue member database 340.

Figure 4:
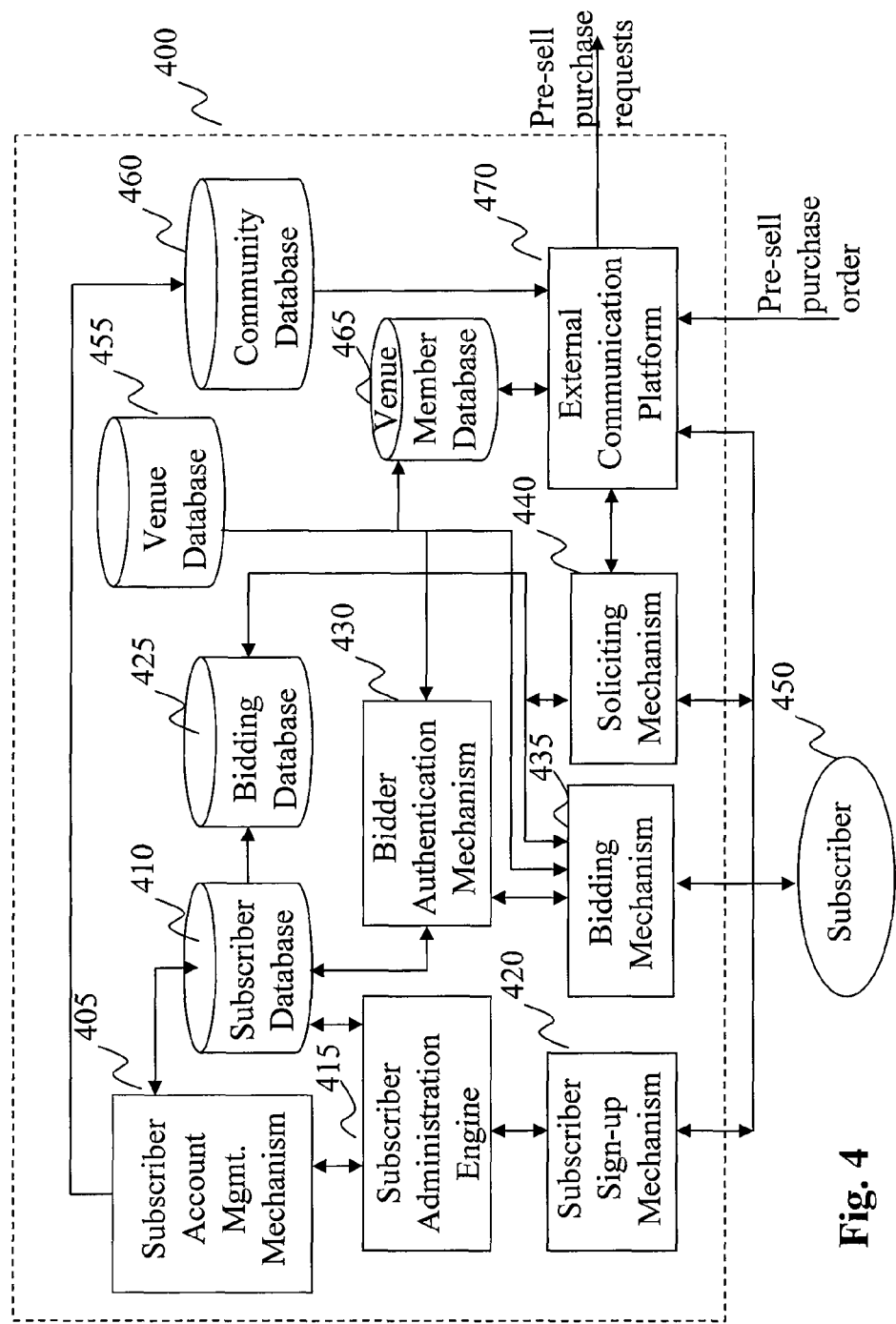
FIG. 4 depicts an exemplary diagram of another sub-system for network-enabled venue booking, according to an embodiment of the present teaching.

FIG. 4 depicts an exemplary diagram of another sub-system 400 for network-enabled venue booking, according to an embodiment of the present teaching. In this exemplary embodiment, a subscriber 450 interacts with the sub-system 400 for different operations related to network-enabled venue booking. As illustrated, the sub-system 400 comprises a subscriber sign-up mechanism 420, a bidding mechanism 435, a subscriber administration engine 415, a subscriber database 410, a bidding database 425, and a venue database 455. Subscriber 450 interacts with the subscriber sign-up mechanism 420 to register as a subscriber of the underlying VBBA system. Via the subscriber administration engine 415, information related to the subscriber is stored in the subscriber database 410. Subscriber information may include name, address, occupation, profession, etc.

When a subscriber's information is stored in the subscriber database 410, it may be used in the future for a variety of purposes. For instance, to solicit bids, the underlying VBBA may classify subscribers according to their professions or occupations and then send invitations for bids to a class of subscribers that is appropriate for a certain type of venue. For example, if a musical hall is a venue registered with a VBBA, the VBBA may identify subscribers whose profession or occupation is related to music performance and send them invitations to bid on available venues. Subscriber's information may also be used for accounting purposes. For instance, each subscriber may need to pay a fee to the VBBA operator on a regular basis (e.g., monthly, quarterly, semi-annually, or annually) to maintain its ability to place a bid for booking a venue via a VBBA. In addition, if a subscriber who has been creditable and frequently generates successful bids for booking venue(s), the VBBA operator may offer a discount to such subscribers. Such information may all be stored in the subscriber database 410 and be used by an optional module, subscriber account management mechanism 405, to carry out different operations.

Subscriber information may also be used, optionally, for authentication purposes when a request is received to bid on a certain venue via the bidding mechanism 435. This may be accomplished by an optional module, bidder authentication mechanism 430, when a request is received for placing a bid to book a venue. When a bidding request is received, the request may include different types of information, e.g., the type of venue needed, locale, capacity, time frame, price requirement, etc. The bidding mechanism 435, upon receiving such information, may first authenticate the party that makes the request to ensure that the party is indeed whom it claims to be. After the authentication, the bidding mechanism 435 then may interact with the venue database 455 to retrieve information related to venues that satisfy the given constraints.

Based on such retrieved venues and associated information, the bidding mechanism 435 may then present the retrieved information to the subscriber. The subscriber may then interactively communicate with the bidding mechanism 435 to browse, select, and place bid(s). For example, there may be multiple venues that satisfy the needs of the subscriber. The subscriber may decide to place a bid for at least some of those appropriate venues. In operation, the bidding mechanism 435 may provide alternative means for the subscriber to place such bids. One option may be to place the same bid on all venues, i.e., with identical terms. Another option is to provide different terms for each venue which reflect the level of desire of the subscriber to ensure its ability to book a particular venue. Each bid is provided to the bidding mechanism 435 with associated terms, e.g., the time frame a bid is directed to, the price the bidder is willing to pay, whether the bidder needs the venue representative to provide, e.g., security guards for the event, etc.

Upon receiving each bid with associated terms, the bidding mechanism 435 may generate such a bid in the bidding database 425. Each bid may be stored against a particular venue being bid on. In addition, the bidding mechanism 435 may also update the information associated with the venue in the venue database 455. For instance, if a particular available slot (or time frame) for a venue has a bid on now, the venue database 455 may need to reflect that update so that other potential bidders will be provided with that information except the identity of the previous bidder(s) and other information which may not be appropriate to disclose to the future bidders.

Sub-system 400 may also optionally provide a subscriber the ability to seek support for his/her bid. To achieve that, there may be additional modules such as a soliciting mechanism 440, which may be designed to enable a subscriber to instruct the underlying VBBA to electronically invite different parties who may be interested in the type of event to be held at a venue for which the subscriber places a bid. For instance, through the soliciting mechanism 440, the VBBA may offer a subscriber different options to reach certain audience. One example type of audience may be members of the venue which the subscriber tries to book. The membership information related to the venue is stored in a venue member database 465.

Another possible source of audiences may be members of Internet communities, which can be the Internet community to which the subscriber belongs or other Internet communities to which the VBBA is associated therewith. For instance, a VBBA may be associated with multiple Internet communities, e.g., through its subscribers, venues registered, or other connections. Therefore, the sub-system 400 may also optionally include a community database 460 which provides sources of third party supporters whom either a subscriber or a venue can reach to help to ascertain or evaluate the value of a bid.

When a subscriber chooses, the optional soliciting mechanism 440 may present multiple sources of supporters to the subscriber and allow the subscriber to specify one or more sources to look for supporters. Upon receiving the subscriber's instructions, the soliciting mechanism 440 may then communicate with an external communication platform 470 and direct it to send solicitation requests to all third party members, e.g., members from different Internet communities or members of different venues.

There may be different forms of support that can be sought. In general, support is a form of pledged commitment. Different forms of commitment may be suitable for different types of events to be held at venues for which bids are placed. For example, if the event to be held at a venue is a musical performance, a commitment in the form of a pre-sell purchase as shown in FIG. 4 from a third party may be appropriate. As another example, if a future event to be held at a venue is a demonstration, a pledged attendance (not shown) may be appropriate. For any commitment whose realization is monetary, the underlying VBBA is to be designed in a way that any pre-sell purchase will not be charged unless the bid is accepted and the future event booked at the bid venue is definitely going to happen.

After electronic invitations to seek support for a bid are sent, the external communication platform 470 may also be responsible for receiving pledged support from all third party invitees. Such received support is then forwarded to the soliciting mechanism 440, which may then dynamically update the relevant bid information stored in the bidding database 425. Such dynamically updated bidding information associated with each bid can then be used subsequently for various purposes, including by a venue representative to check the status of the bid(s) associated with a particular venue in order to determine whether a decision should be made as to each bid. This will be described below with reference to FIGS. 9-10.

Figure 5:
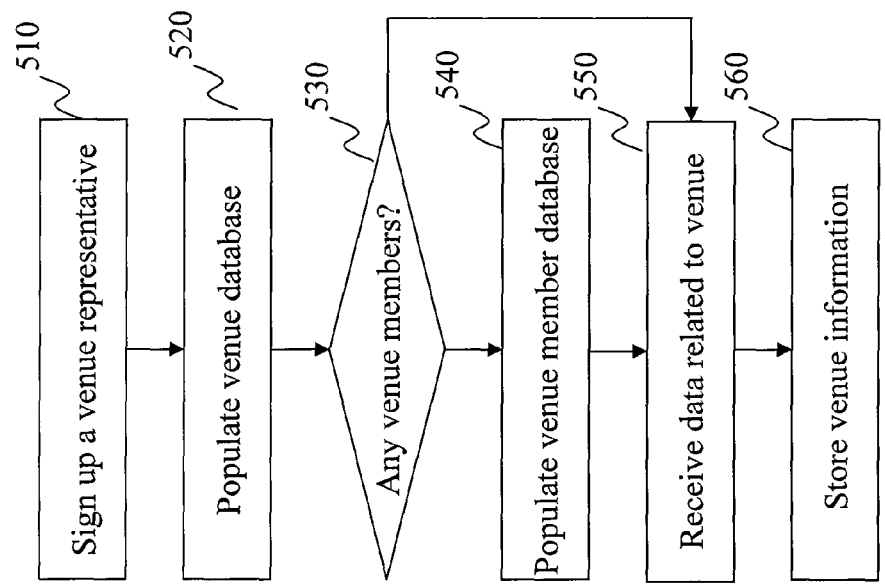
FIG. 5 is a flowchart of an exemplary process in which a venue representative signs up with a system for network-enabled venue booking, according to an embodiment of the present teaching.

FIGS. 5-10 provide various flowcharts of exemplary processes in which venue representatives and subscribers can utilize VBBA to accomplish network-enabled venue booking. FIG. 5 is a flowchart of an exemplary process in which a venue representative signs up with a VBBA system for network-enabled venue booking, according to an embodiment of the present teaching. A venue representative first signs up with a VBBA system at 510. Based on information provided by the venue representative, the venue database is populated at 520. Inquiry may be made, at 530, as to whether the represented venue has any members associated therewith. If there are such members, information related to the members and their relationships (e.g., gold, silver, or normal memberships) with the venue may be obtained to populate, at 540, the venue member database. If there are no members, the VBBA directly proceeds to receive, at 550, other information related to the registered venues. As discussed previously, e.g., the locale, capacity, availability of the venues, desired types of events to be held, or asking price for the booking. Such information associated with the registered venue can be stored, at 560, for future use. This part of the interaction between a VBBA and venue representatives enables the VBBA to establish information necessary to make network-enabled venue booking possible. Such information may then be retrieved whenever a subscriber is interested in placing a bid to book a venue.

Figure 6:
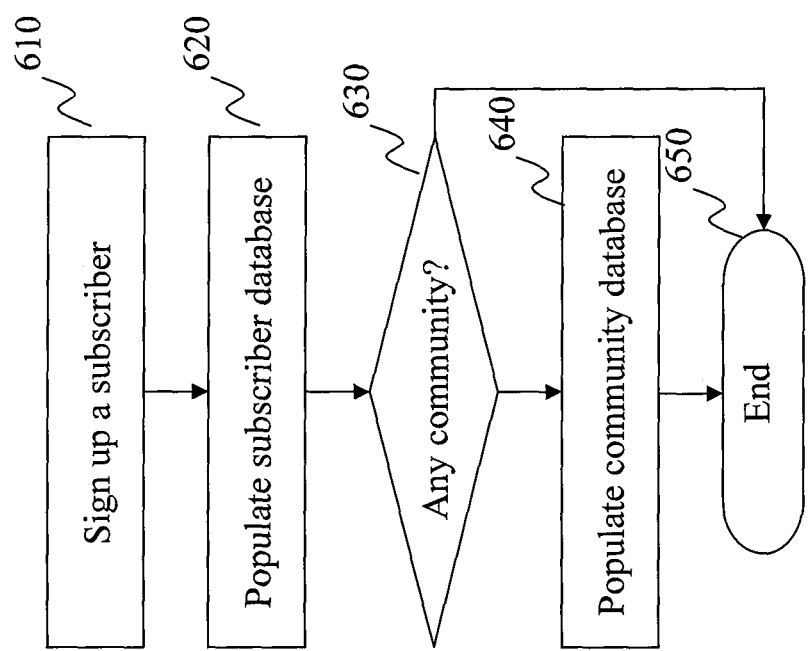
FIG. 6 is a flowchart of an exemplary process in which a subscriber signs up with a system for network-enabled venue booking, according to an embodiment of the present teaching.

Subscribers may also sign up with the VBBA. FIG. 6 is a flowchart of an exemplary process in which a subscriber signs up with a VBBA for network-enabled venue booking, according to an embodiment of the present teaching. A subscriber first signs up with a VBBA system at 610. Based on information provided by the subscriber, the subscriber database is populated at 620. Inquiry may be made, at 630, as to whether the subscriber has communities associated therewith. If there are such communities, information related to the communities and their relationships with the subscriber may be obtained to populate, at 640, the community database. If the VBBA is deployed within a particular Internet community, e.g., Face Book, that Internet community may be automatically recorded in the VBBA as a community to which the subscriber belongs or can reach. The subscriber may also specify other types of communities such as buddies in a buddy list, an email alias representing a social circle, a particular domain name representing some kind of organization, etc. This part of the interaction between a VBBA and a subscriber enables the VBBA to establish information necessary to make network-enabled venue booking possible. Such venue and subscriber information may then be retrieved whenever a subscriber is interested in placing a bid to book a venue.

Figure 7:
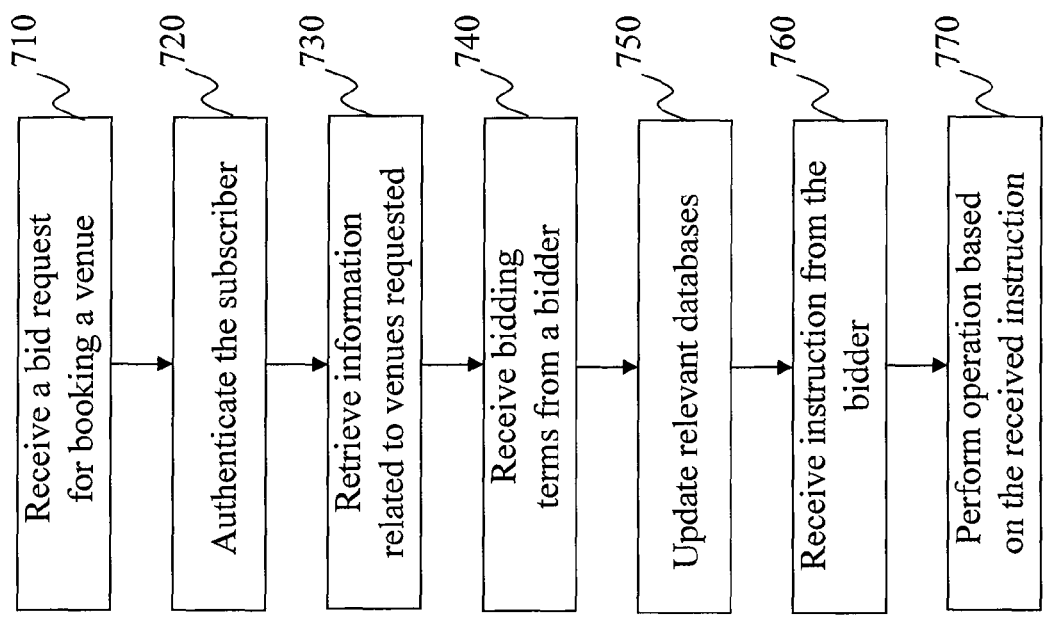
FIGS. 7-8 are flowcharts of exemplary processes in which a subscriber interacts with a system for network-enabled venue booking, according to an embodiment of the present teaching.
Figure 8:
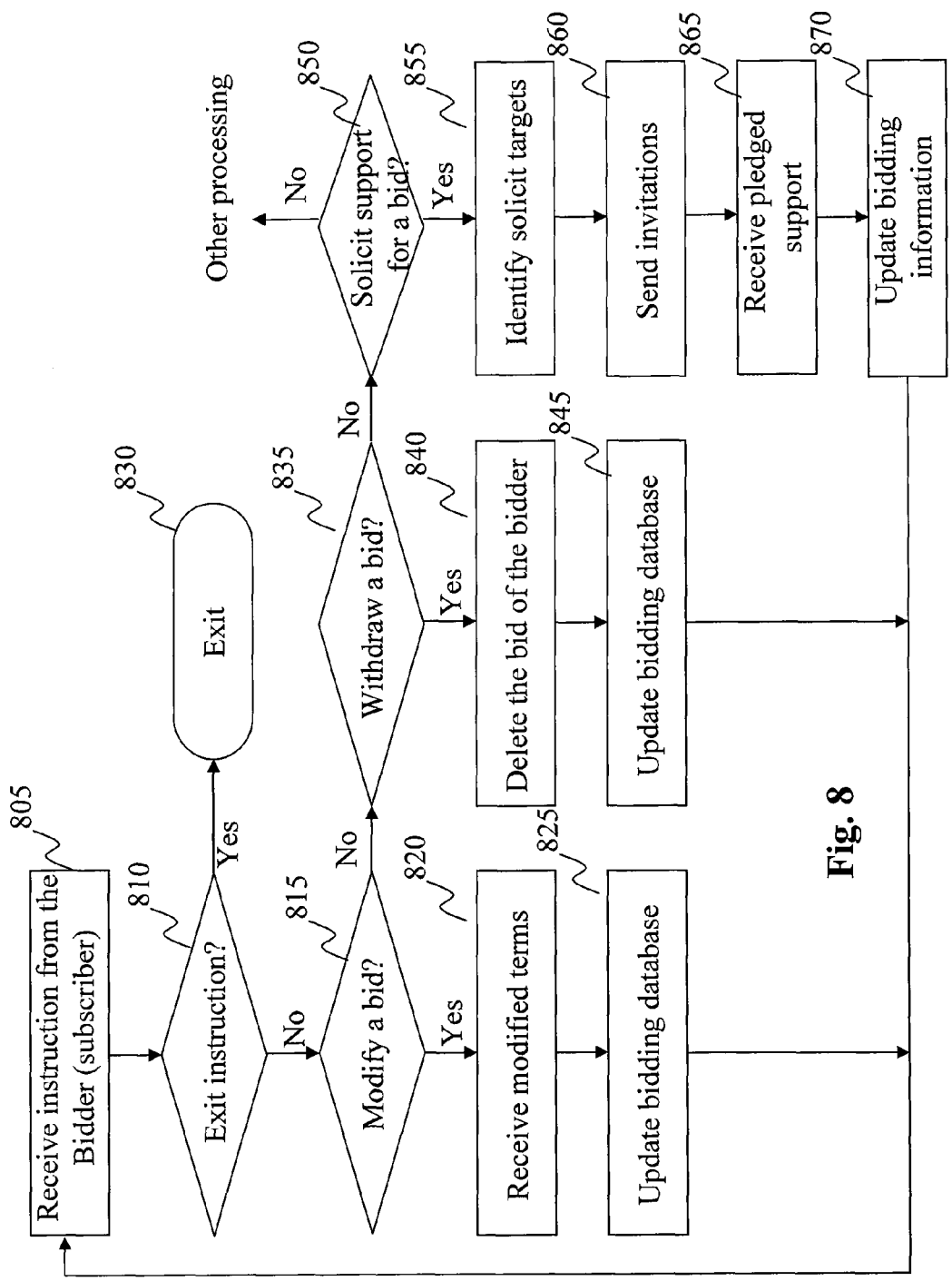

FIGS. 7-8 are flowcharts of exemplary processes in which a subscriber interacts with a system for network-enabled venue booking, according to an embodiment of the present teaching. In operation, to facilitate a subscriber to place a bid, the VBBA receives, at 710, a request from a party requesting to place a bid on a particular type of venue. Upon receiving such a request, the VBBA authenticates, at 720, the party who desires to place the bid. If authentication indicates that the party who made the request is eligible to place a bid, the VBBA retrieves, at 730, the availability information relating to the types of venues desired from the venue database and presents such information to the authenticated subscriber. The VBBA then receives, at 740, a bid from the subscriber with associated bidding terms.

Based on the received bid information, the VBBA updates, at 750, relevant databases. As discussed herein, such databases may include the bidding database as well as the venue database. Regarding the bidding database, the VBBA may add an additional entry representing the new bid. As to the venue database, the VBBA may update the bidding information related to the venue that the new bid is placed for. The VBBA may then wait to receive further instruction from the subscriber for additional operations. When such an instruction is received, at 760, the VBBA proceeds to perform the requested operations at 770. Details of the operations that a subscriber may request the VBBA to perform are described in FIG. 8.

When the VBBA receives, at 805, an instruction from a bidder, the type of instruction is first determined at 810. If it is an instruction for exiting the system, the VBBA proceeds to exit the system at 830. If it is not an exit instruction, it is further determined, at 815, whether the received instruction relates to a request to modify a bid. If it is a request to modify a bid, the VBBA further receives, at 820, information from the bidder related to modified terms and then updates, at 825, the bid by accordingly modifying the terms previously stored in the bidding database. In some situations, the VBBA may additionally update the venue database to reflect such changes (not shown in FIG. 8).

If the received instruction is not for modifying bidding terms, it is further determined, at 835, whether the received request is for withdrawal of a particular bid. If it is a request to withdraw a bid, the VBBA accordingly deletes, at 840, the bid and updates, at 845, relevant databases. If the received request is not for withdrawal of a bid, it is further determined, at 850, whether it is for soliciting support for a particular bid. If it is, the VBBA further interacts with the subscriber to identify, at 855, solicitation targets and send invitations, at 860, to such identified targets. With respect to such solicitations sent, the VBBA coordinates to receive, at 865, corresponding pledged support and based on such pledged support, the VBBA updates, at 870, relevant databases to reflect the dynamic status of the underlying bid.

Other processes describing interactions between the VBBA and subscribers are also possible but not shown here. For example, a subscriber may interact with VBBA for other account management issues subscriber information changes such as contact information change, accounting, receivable/payable, etc. The present disclosure focuses on the aspects of operations related to network-enabled venue booking. It is understood that to facilitate network-enabled venue booking, other sub-systems necessary to support the venue booking operations can be implemented. VBBA may also include a sub-system (not shown) that provides post-processing capabilities such as contracts, forms, ticket sales, secure transactions, clearing house, etc. As disclosed herein with reference to FIGS. 12 and 13, VBBA may also be designed so that it is capable of soliciting third party vendor bids for value-added services such as legal services, equipment rental, roadies, etc.

Figure 9:
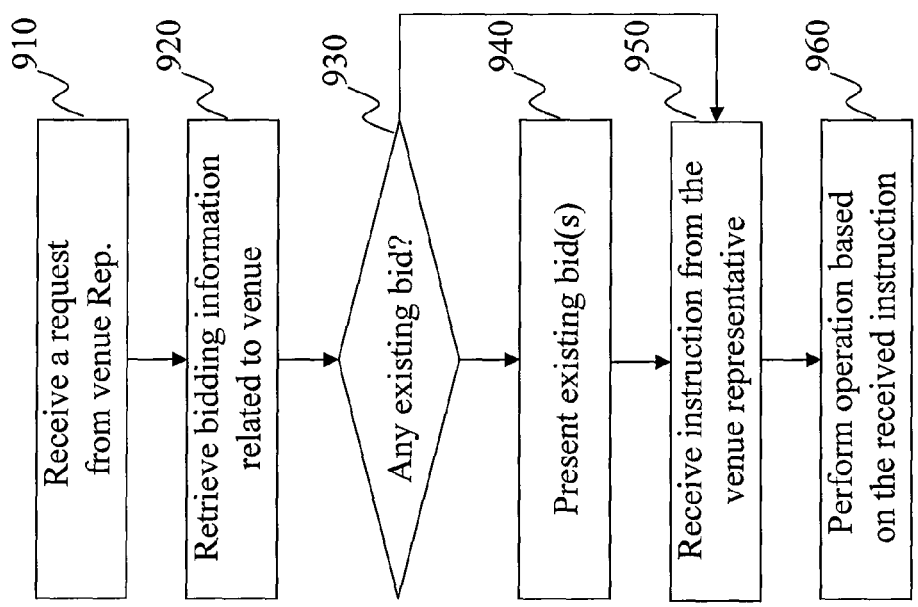
FIGS. 9-10 are flowcharts of exemplary processes in which a venue representative interacts with a system for network-enabled venue booking, according to an embodiment of the present teaching.
Figure 10:
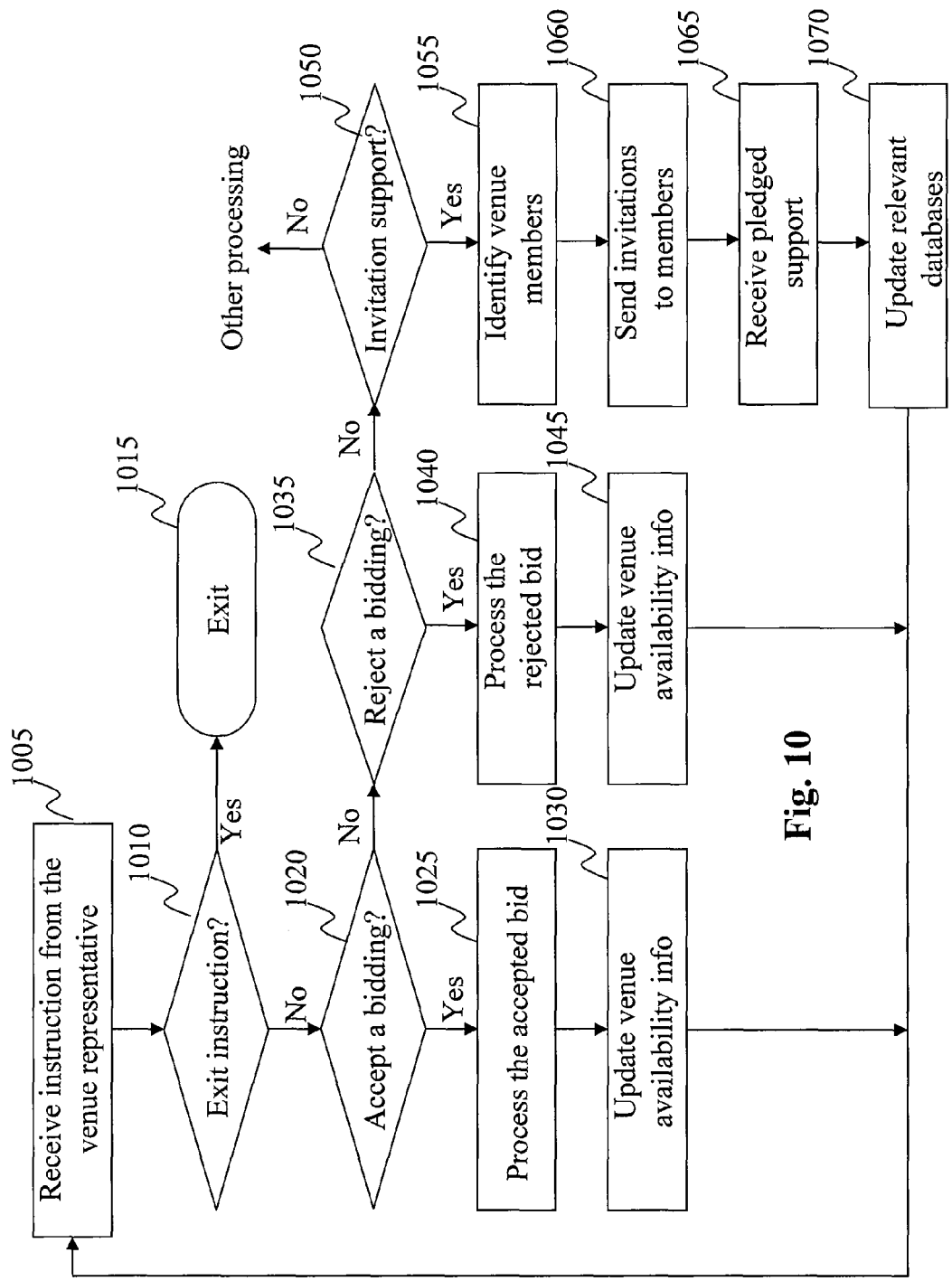

When bids from subscribers are placed to book different venues and updated dynamically based on, e.g., pledged support, venue representatives representing such venues may interface with VBBA to review the dynamically updated bidding status of their venues and make decisions on the bids. FIGS. 9-10 are flowcharts of exemplary processes in which VBBA interacts with a venue representative for network-enabled venue booking, according to an embodiment of the present teaching. In FIG. 9, a request from a venue representative is first received at 910. Such a request may be related to accessing information related to the bids for booking the venues represented by the venue representative. Upon such a request, the VBBA retrieves, at 920, information associated with the bids placed on the relevant venue. If such bidding information exists, determined at 930, the VBBA presents, at 940, such retrieved bidding information to the venue representative. If no such information exists, no result is presented and the VBBA informs the venue representative as such (not shown).

After the retrieved bidding information is presented to the venue representative, the VBBA waits to receive further instruction from the venue representative. Once additional instruction is received, at 950, from the venue representative, the VBBA proceeds to perform, at 960, the operations requested by the venue representative, as described with reference to FIG. 10.

In FIG. 10, when an instruction is received, at 1005, from a venue representative, the type of instruction is first determined at 1010. If it is an instruction for exiting the system, the VBBA proceed to exit the system at 1015. If it is not an exit instruction, it is further determined, at 1020, whether the received instruction relates to a request to accept a bid. If it is a request to accept a bid, the VBBA carries out certain operations, at 1025, with respect to the accepted bid and then updates accordingly, at 1030, relevant databases such as the venue database to change the availability, etc. or bidding database to close the bid for the underlying venue.

If the received instruction is not for accepting a bid, it is further determined, at 1035, whether the received request is for rejecting a particular bid. If it is a request to reject a bid, the VBBA accordingly processes, at 1040, the bid to be rejected and updates, at 1045, relevant databases. In rejecting a bid, the VBBA may not simply delete the bid from relevant databases because the bidder may come back to the bid with modified terms. Therefore, the update based on a request of rejecting a bid may be different from the operation performed for a request to withdraw a bid. The former is initiated by a venue representative based on an evaluation of the bid terms while the latter is initiated by a bidder who placed the bid, no matter what the terms are. In general, a bid may not be deleted until the party who placed the bid withdraws the bid. However, other arrangements are also possible, depending on the need of the application.

If the received request is not for rejecting a bid, it is further determined, at 1050, whether it is for inviting pledged support for a particular bid placed for booking a particular venue. If it is, the VBBA identifies, at 1055, members of the venue for which the bid is placed and sends invitations, at 1060, to such identified members. Compared with the situation in which a subscriber solicits pledged support for his/her bid, a request to solicit pledged support initiated from a venue representative may be targeted only at the members of the underlying venue. With respect to such invitations, the VBBA coordinates to receive, at 1065, corresponding pledged support from such members and based on such pledged support, the VBBA updates, at 1070, relevant databases to reflect the dynamic status of the underlying bid.

Other processes describing interactions between VBBA and a venue representative are also possible but not shown here. For example, a venue representative may interact with VBBA for different account management issues such as address change, venue profile information change, accounting, receivable, etc. The present teaching focuses on the aspects of operations related to network-enabled venue booking.

Figure 11:
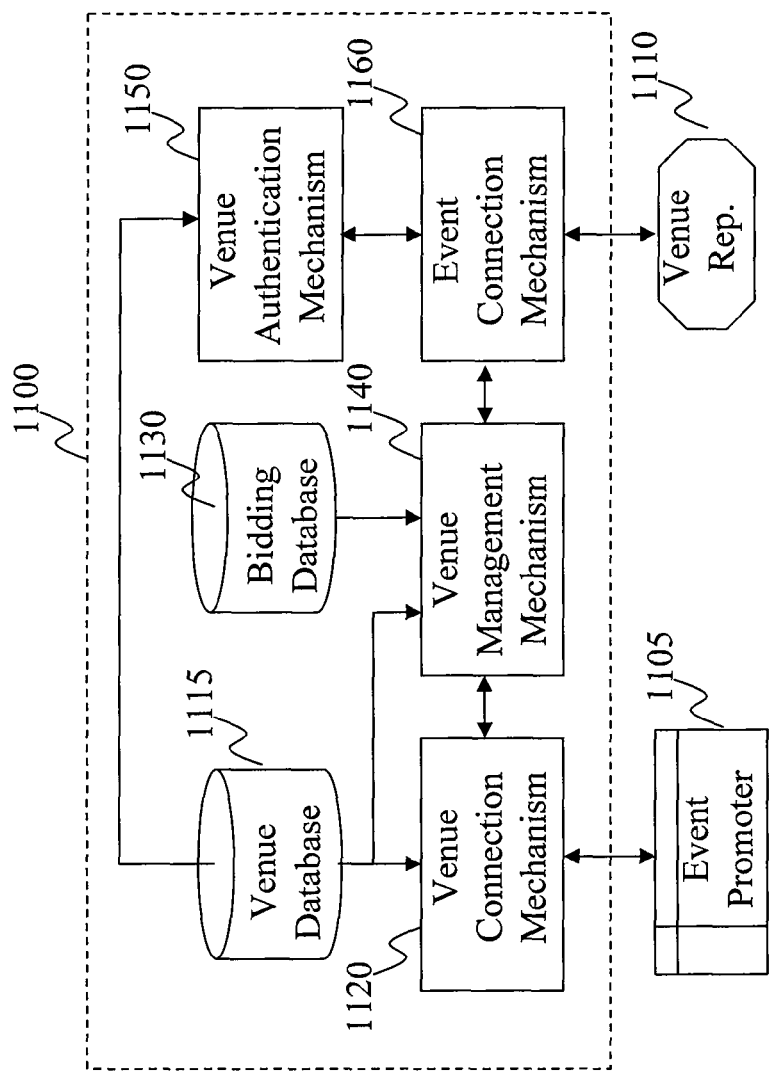
FIG. 11 depicts an exemplary diagram of yet another sub-system for network-enabled venue booking, according to an embodiment of the present teaching.

FIG. 11 depicts an exemplary diagram of an optional sub-system 1100 for network-enabled venue booking, according to an embodiment of the present teaching. The sub-system 1100 is provided for interactions and coordination between an event promoter 1105 and a venue representative 1110. The sub-system 1100 comprises a venue connection mechanism 1120 and an event connection mechanism 1160. The venue connection mechanism 1120 provides, at least partially, an interface between an event promoter and a venue representative via VBBA. Similarly, the event connection mechanism 1160 provides, at least partially, an interface between a venue representative and an event promoter. Both the venue connection mechanism 1120 and the event connection mechanism 1160 communicate with other components and modules as described above, such as the venue management mechanism 1140, the venue authentication mechanism 1150, the venue database 1115, and the bidding database 1130, for the operations as disclosed herein.

Via the venue connection mechanism 1120, an event promoter is able to browse different venues available and associated information in light of the one or more events that the event promoter is to promote and organize. Based on the venue availability information, the event promoter 1105 can offer certain proposals for organized events at certain types of venues (e.g., musical halls with a certain capacity) to one or more venue representatives that represent such types of venues via the venue connection mechanism 1120. Such offers may be forwarded to the venue management mechanism 1140 and be allocated to a group of venue representatives that fit the needs of the events being organized.

The venue management mechanism 1140 may inform venue representatives so identified via the event connection mechanism 1160. Upon being informed of such possibilities of organizing proposed events at their venues, the venue representatives may, via the event connections mechanism 1160, accept or reject such proposals or make counter proposals. If a venue representative accepts a proposed event organized at his/her venue, specific information describing the accepted event during the proposed time frame may now be used to update the venue information and specified as constraints to the availability of the venue.

Such stored constraints in connection with an event promoted by an event promoter and accepted by the venue representative can be retrieved and reviewed by a potential bidder when he/she is considering whether to place a bid for the venue. For example, if an event promoter is proposing a Jazz festival, composed of several specific types of Jazz music (e.g., Latin, American, and Asian Jazz), during a certain time frame (e.g., the first week of April, 2010) at a specific Plaza located in downtown, New Orleans, if the venue representative for the specific Plaza in New Orleans accepts the proposal, then the availability of the Plaza during the first week of April, 2010, will be listed as being used for certain types of music bands. With this constraint, any subscriber who reviews the availability of the Plaza is made to understand that any bid that will be considered should meet such requirement.

When the event promoter is examining the availability information related to different venues, current bidding status associated with the types of venues sought by the event promoter may also be retrieved from the bidding database via the venue management mechanism 1140. In this manner, the event promoter can decide with more of such detailed information as to which venue is appropriate to propose the event desired. In some situations, even though there are bids already made to book a venue, an event promoter can still proposed his/her desired event in the same venue if the bidder falls within the profiles of the event participants. In this case, the event promoter can still proceed with its event proposal to relevant venue representatives in light of the current bidding status to book interested venues. In some situations, there may be already a significant bid placed on a venue that an event promoter is interested in but the bidder will host an event that is not consistent with the scheme of the event that the event promoter is going to propose. In this case, the event promoter may give up this specific venue due to the conflict.

In some embodiments, in addition to interfacing with venue representatives, event promoters, or subscribers, a VBBA may also provide the functional modules via which a consumer may interface with VBBA to invite a bid. Such an invited bid may be directed to a particular bidder, e.g., a consumer may send an invitation to singer Nicole King to place a bid for a venue near where the consumer resides. Such an invited bid may also be directed to any potential bidder who holds a particular type of event, e.g., a consumer may send an invitation to all bidders who are capable of giving a Jazz concert. Specifics of the invitation may be provided in the context of the invitation and then processed by VBBA. Depends on the nature of the invitation, the VBBA may archive such an invitation differently and then direct the invitation to one or more bidders who satisfy the condition of the invitation. In addition, a potential bidder may also plan an event or place a bid based on the market demand, determined at least partially based on the invitations related to the bidder.

Figure 12:
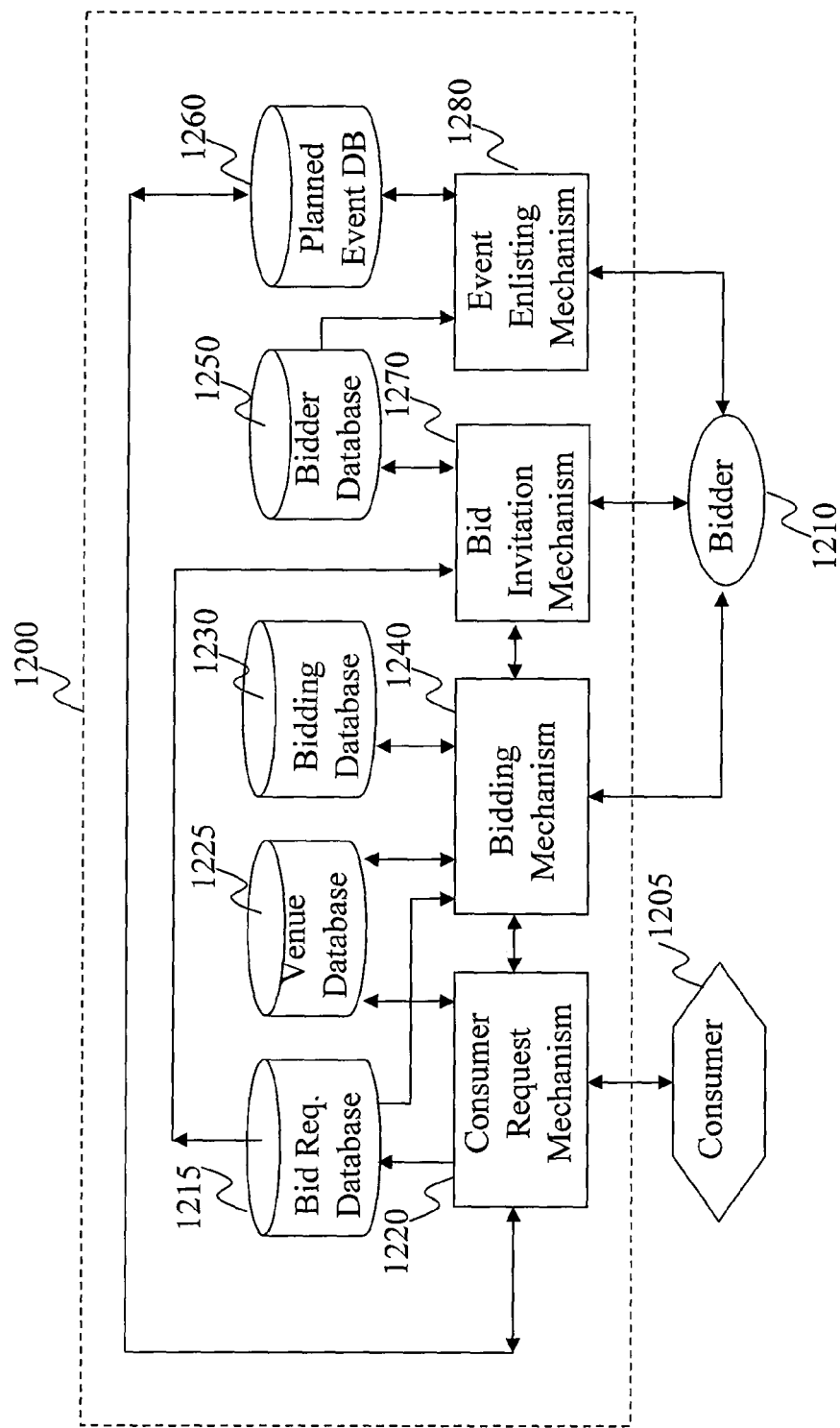
FIG. 12 depicts an exemplary sub-system for facilitating a consumer to request a bid for booking a venue, according to an embodiment of the present teaching.

FIG. 12 depicts a demand-supply sub-system 1200 within a VBBA system to enable such functions, according to an embodiment of the present teaching. The sub-system 1200 comprises a consumer request mechanism 1220, a bid invitation mechanism 1270, and an event enlisting mechanism 1280. A consumer 1205 interacts with the consumer request mechanism 1220 to provide a request for a bid. Upon receiving the request to invite a bid, the consumer request mechanism 1220 process the request. The consumer request mechanism 1220 may also interact with the venue database 1235 and the bidding mechanism 1240 to determine how the request is directed and then appropriately archives the request in a bid request database 1215.

The archived request for a bid in the bid request database 1215, may then be retrieved by the bid invitation mechanism 1270. Based on how such a request is archived, the bid invitation mechanism 1270 may then direct the request for a bid to appropriate bidder. For instance, if the invitation is directed to a specific bidder (e.g., Nicole King), the request is sent to the intended bidder. If the request is intended for any bidder that intends to give a Jazz concert, the bid invitation mechanism 1270 may retrieve all information related to potential bidders, from the bidder database 1250, that satisfy the conditions specified in the request. Based on the retrieved information, the bid invitation mechanism 1270 may then send such a request to each and every potential bidder.

In some embodiments, a consumer may access, via the consumer request mechanism 1220, information related to all future planned events enlisted by potential bidders prior to make a request. In this case, the consumer request mechanism 1220 retrieves relevant information from a planned event database 1260, which is populated based on enlisted events from potential bidders, provided via the event enlisting mechanism 1280. On the other hand, a potential bidder may also access the bid request database 1215, via the bid invitation mechanism 1270, to examine whether there exists any request for a bid that is directed to the bidder (either specifically directed to the bidder or directed to a type of event that the bidder can provide). For instance, if there is a significant number of requests for bid directed to the bidder for a bid in a specific venue, although the bidder has not previously sensed the need and planned an event at that venue, a examination of the existing requests would reveal that there is a significant demand which may persuade the bidder to enter, via the event enlisting mechanism 1280, a planned event to satisfy that demand.

In some embodiment, VBBA further enables a third party service provider to utilize its platform to offer or bid value-added services in association with a future event. For example, if a trade show is to be held at a convention center, various third party service providers can offer various amenities at the convention center. Examples of such third party services includes travel services, tour guides, transportation, rental items for the hall, hotels, security at the site, a clearing house in case there are contracts to be formed on the convention site, etc. Another example for incorporation of such third party service bid to the scheme described herein for booking a venue is property rental. Each piece of real estate property for rental is a venue. A potential renter is a bidder. In this case, third party service providers may bid services such as furniture rental, renovation services, etc.

Such third party services may be tied to a bidder hosting an event or to the venue or a combination of both. For example, some third party vendors for providing food may bid for services at a convention center (venue) and such services are tied to the convention center. In another example, a record manufacturer may offer services to sell CDs of a music band (bidder) at a music event where the band is giving a performance. In this case, the third party vendor is tied to a bidder (the music band).

Figure 13:
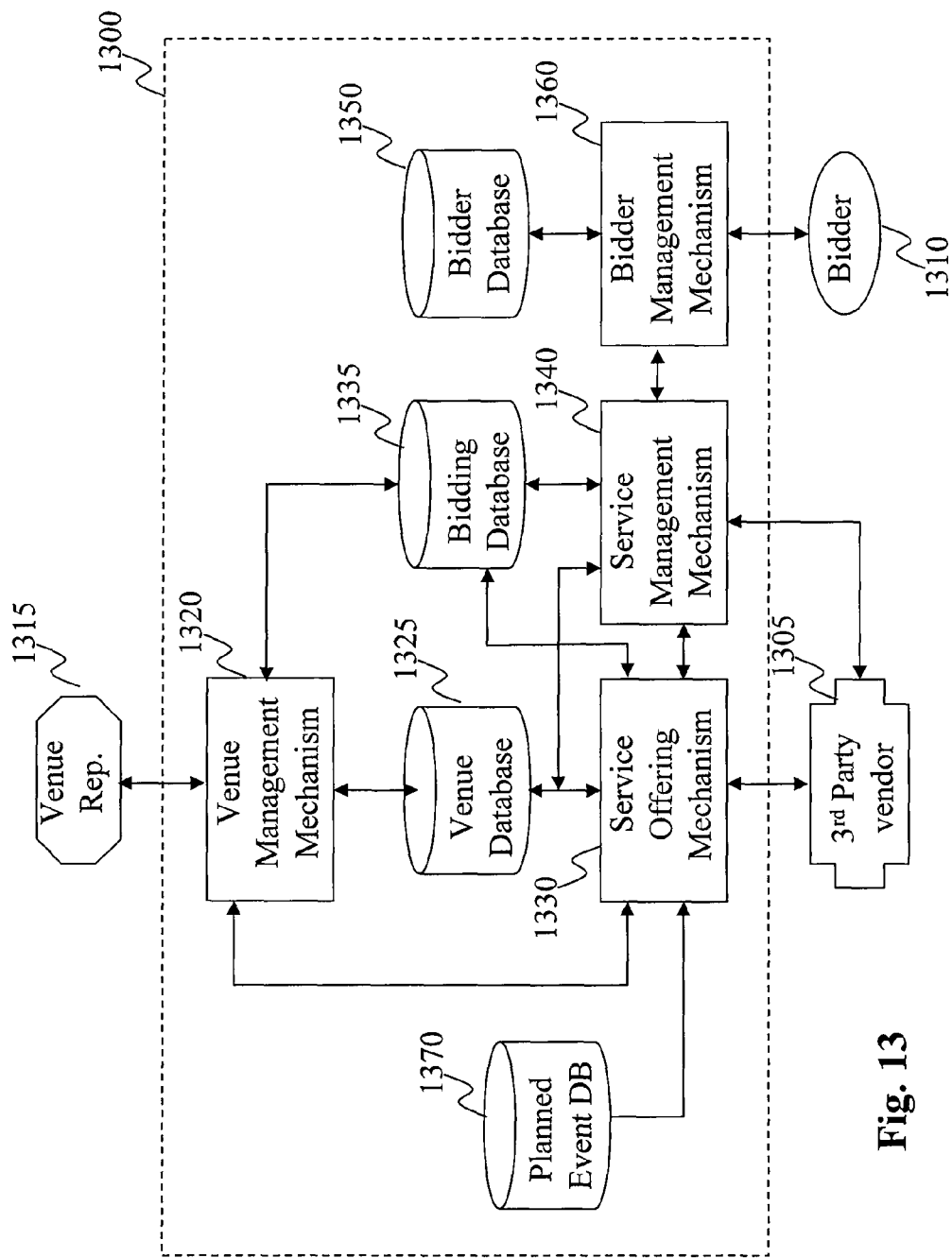
FIG. 13 depicts an exemplary sub-system for facilitating a third party vendor to bid for providing value-added services to an event held at a venue, according to an embodiment of the present teaching.

FIG. 13 depicts an exemplary sub-system 1300 for facilitating third party vendors to bid and provide value-added services at a future event to be held at a venue, according to an embodiment of the present teaching. The sub-system 1300 comprises a service offering mechanism 1330 and a service management mechanism 1340. A third party vendor 1305 can interface with the service offering mechanism 1330 to view information related to venues, biddings, and planned events stored in a venue database 1325, a bidding database 1335, and a planned event database 1370. Based on such information, the third party vendor 1305 can place a bid either to a bidder who placed a bid for booking a venue or to a venue that may have multiple bids placed for booking various future events.

The bids placed for value-added services may then be placed in appropriate databases. For instance, if a third party vendor 's bid is directed to a planned event of a potential bidder, the bid for value-added services may be placed in the bidder database 1335 so that the bidder 1310 can view, when needed, what kind of value-added services have been offered for which planned event and can decide whether to accept or refuse via the bidder management mechanism. If a third party vendor's bid is directed to a venue, the bid for value-added services may be stored and indexed with respect to the venues in the venue database 1325 so that a venue representative 1315 can view who offered what and decide whether to accept or refuse via the venue management mechanism 1320.

Once a bid for value-added third party service is accepted, relevant databases may be updated. For instance, if third party vendor's offering for transportation services to a convention center (venue) is accepted, the venue database 1325 may be updated to reflect that. In this case, the service management mechanism 1340 will take over the service management and interface with the third party vendor 1305 regarding the execution details of such services.

While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

I claim:

1. A system implemented on a computer having at least one processor, storage, and a communication platform for venue bidding over network connections, comprising:
a venue bidding sub-system, implemented on the computer and deployed over a network, configured for, via the network,
retrieving information related to a venue including at least one criterion specified by a venue representative in connection with a solicitation for at least one bid on the venue with the at least one criterion,
displaying the retrieved information related to the venue to one or more subscribers of the venue bidding system,
receiving at least one bid from the one or more subscribers, in response to the solicitation with respect to the venue with the at least one criterion, to book the venue for a future event in compliance with the at least one criterion, and
storing the at least one bid via electronic means; and
a venue representative control sub-system, implemented on the computer and deployed over a network, configured for
facilitating the venue representative to make the solicitation with the at least one criterion to be satisfied by the at least one bid,
providing information related to the at least one bid to the venue representative, and
facilitating, electronically via the network, the venue representative to select, at the venue representative's discretion, a bid placed by a subscriber to book the venue for a future event via the venue bidding sub-system.

2. The system according to claim 1, wherein the information related to a venue includes at least one of locale of the venue, capacity of the venue, a description of the venue, and availability of the venue.

3. The system according to claim 1, wherein the venue representative control sub-system comprises a venue sign up mechanism configured for
signing up, via the network, the venue representative;
receiving, from the venue representative, the information related to the venue; and
establishing retrievable records related to the venue based on the information related to the venue.

4. The system according to claim 3, wherein the venue representative sign up mechanism is further capable of:
receiving information regarding one or more members of the venue; and
associating information regarding the one or more members of the venue to the information related to the venue.

5. The system according to claim 1, further comprising a subscriber sign up mechanism configured for
signing up, via the network, a subscriber;
receiving information related to the subscriber; and
storing, in the storage, a record related to the subscriber based on the information related to the subscriber for future use.

6. The system according to claim 1, wherein the venue representative control sub-system comprises a support seeking platform configured for enabling the venue representative to request, via the network, to invite one or more members of the venue to vote for support an event for which the bid is placed.

7. The system according to claim 6, wherein the pledged support includes one of a pre-sell purchase order and a pledged commitment to participate in the future event hosted by the subscriber who placed the bid.

8. The system according to claim 1, wherein the venue bidding sub-system comprises:
a bidding mechanism configured for enabling a subscriber to place a bid for booking a venue based on the information related to the venue; and
a soliciting mechanism configured for enabling an electronic communication channel through which the subscriber who placed a bid can solicit a pledged support from another to support the bid placed by the subscriber.

9. The system according to claim 8, wherein the another whose pledged support is solicited includes at least one of:
members of a community to which the subscriber who places the bid belongs,
buddies of the subscriber,
members of the venue for which the subscriber places a bid; and
any person associated with the subscriber in an electronically identifiable manner.

10. The system according to claim 1, wherein the venue representative control sub-system comprises:
a venue representative control mechanism configured for assisting the venue representative on one or more bids placed by one or more subscribers to book a venue represented by the venue representative; and
a support identification mechanism configured for assisting the venue representative to invite a pledged support, via electronic means, from a member of the venue to place a bid for booking a venue represented by the venue representative.

11. The system according to claim 1, wherein the system for booking a venue for a future event is embedded in an Internet community.

12. The system according to claim 1, further comprising a demand-supply sub-system configured for allowing a consumer to make a request for a subscriber to place a bid at a certain venue.

13. The system according to claim 12, wherein the demand-supply sub-system comprises:
a consumer request mechanism configured for enabling the consumer to send a bid request;
a bid invitation mechanism configured for sending an invitation to a subscriber to place a bid; and
an event enlisting mechanism configured for interacting with a subscriber to specify an event that the subscriber intends to hold in future.

14. The system according to claim 13, wherein
the bid request is for a bid from a specified subscriber; and
the invitation for the bid is sent to the specified subscriber.

15. The system according to claim 13, wherein
the bid request is for a bid from a subscriber that is to hold a specified event; and
the invitation for the bid is sent to a subscriber that is to hold the specified event.

16. The system according to claim 13, wherein the subscriber specifies an event to be held in accordance with one or more bid requests from at least one consumer.

17. The system according to claim 13, wherein the subscriber who placed a bid places the bid in accordance with one or more bid requests from at least one consumer.

18. The system according to claim 1, further comprising a third party service sub-system configured for allowing a third party service provider to offer a service to a future event.

19. The system according to claim 18, wherein the third party service sub-system includes:
   a service offering mechanism configured for enabling a third party vendor to offer the service; and
   a service management mechanism configured for connecting the service with a future event to be held at a venue.

20. The system according to claim 19, wherein the service is offered in association with a venue, represented by a venue representative.

21. The system according to claim 19, wherein the service is offered with respect to a future event associated with a subscriber who is to bid a venue to hold the event.

22. The system according to claim 1, further comprising:
   a venue connection mechanism configured for
      presenting the information related to the venue to an event promoter,
      receiving a proposed event from the event promoter made based on the information related to the venue, and
      forwarding the proposed event from the event promoter to the venue representative of the venue; and
   an event connection mechanism configured for
      receiving the proposed event prepared by the event promoter,
      sending the proposed event to the venue representative,
      upon a request, providing a bidding status associated with the venue to the venue representative,
      receiving a response to the proposed event from the venue representative, and
      updating relevant information associated with the venue.

23. A method implemented on a computer having at least one processor, storage, and a communication platform capable of connecting to a network for booking a venue to hold a future event, comprising:
   retrieving, from the storage, information related to a venue including at least one criterion specified by a venue representative in connection with a solicitation for at least one bid on the venue with the at least one criterion;
   displaying the retrieved information related to the venue to one or more subscribers of the venue bidding system;
   receiving, over the network via a venue bidding sub-system implemented on the computer, at least one bid from the one or more subscribers, in response to the solicitation with respect to the venue with the at least one criterion, to book the venue for a future event;
   storing the at least one bid via electronic means;
   facilitating the venue representative to make the solicitation with the at least one criterion to be satisfied by the at least one bid;
   providing, by a venue representative control sub-system implemented on the computer and deployed over the network, information related to the at least one bid to the venue representative; and
   facilitating, by the venue representative control sub-system via the network, the venue representative to select, at the venue representative's discretion, a bid placed by a subscriber to book the venue for a future event.

24. The method according to claim 23, further comprising:
   signing up, over the network via a venue sign-up mechanism implemented on the computer, the venue representative;
   receiving, from the venue representative, the information related to the venue; and
   storing, in the storage, a record related to the venue based on the information related to the venue for future use.

25. The method according to claim 24, further comprising:
   receiving information regarding one or more members of the venue; and
   associating information regarding the one or more members of the venue to the information related to the venue.

26. The method according to claim 23, further comprising:
   signing up, via the network, a subscriber;
   receiving information related to the subscriber; and
   establishing retrievable records related to the subscriber based on the information related to the subscriber.

27. The method according to claim 26, further comprising:
   receiving information regarding one or more associates of the subscriber; and
   associating information regarding the one or more associates of the subscriber to the information related to the subscriber.

28. The method according to claim 23, further comprising assisting the subscriber who placed a bid to solicit a pledged support, via electronic means, from another to support the bid placed by the subscriber.

29. The method according to claim 28, wherein the pledged support includes one of a pre-sell purchase order and a pledged commitment to participate in the future event hosted by the subscriber who placed the bid.

30. The method according to claim 23, further comprising assisting the venue representative to invite a pledged support, via electronic means, from a member of the venue to place a bid for booking a venue represented by the venue representative.

31. The method according to claim 23, wherein the method for booking a venue for a future event is embedded in an Internet community.

32. The method according to claim 23, further comprising:
   presenting the information related to the venue to an event promoter;
   receiving a proposed event from the event promoter made based on the information related to the venue;
   forwarding the proposed event from the event promoter to the venue representative of the venue;
   receiving the proposed event prepared by the event promoter;
   sending the proposed event to the venue representative;
   upon a request, providing a bidding status associated with the venue to the venue representative;
   receiving a response to the proposed event from the venue representative; and
   updating relevant information associated with the venue.

33. The method according to claim 32, wherein the event promoter is selected automatically to place a bid on the venue on the future event where the event promoter is considered to be appropriate for making a bid on the future event to be hosted at the venue.

34. The method according to claim 23, further comprising facilitating a consumer to make a request for a subscriber to place a bid at a certain venue.

35. The method according to claim 34, wherein the facilitating comprises:
   receiving a bid request from the consumer;
   sending an invitation to a subscriber to place a bid; and
   interacting with a subscriber to specify an event that the subscriber intends to hold in future.

36. The method according to claim 35, wherein the subscriber specifies an event to be held in accordance with one or more bid requests from at least one consumer.

37. The method according to claim 35, wherein the subscriber who placed a bid places the bid in accordance with one or more bid requests from at least one consumer.

38. The method according to claim 23, further comprising facilitating a third party service provider to offer a service to a future event.

39. The method according to claim 38, wherein the step of facilitating comprises:
   receiving information from a third party vendor to offer the service; and
   connecting the offered service with a future event to be held at a venue.

40. The method according to claim 39, wherein the service is offered in association with a venue, represented by a venue representative.

41. The method according to claim 39, wherein the service is offered with respect to a future event associated with a subscriber who is to bid a venue to hold the event.

42. The method according to claim 23, wherein the each of the one or more subscribers is invited to place a bid on the venue for the future event where the subscriber is selected automatically based on a determination that the subscriber is appropriate for making a bid on the future event specified by the venue representative.

* * * * *